United States Patent [19]

Cohen

[11] 4,426,201
[45] Jan. 17, 1984

[54] SCREW FEED/RAM INJECTOR

[76] Inventor: Zachariha Cohen, c/o U.S. Molding Machinery Company, 21200 St. Clair Ave., Cleveland, Ohio 44117

[21] Appl. No.: 299,166

[22] Filed: Sep. 3, 1981

[51] Int. Cl.³ .............................................. B29F 1/08
[52] U.S. Cl. .................................... 425/147; 425/548; 425/549; 425/550; 425/558
[58] Field of Search ............... 425/135, 136, 147, 148, 425/543, 544, 548, 549, 550, 558

[56] References Cited

U.S. PATENT DOCUMENTS

| 2,309,943 | 2/1943 | Ernst | 425/550 X |
| 2,322,200 | 6/1943 | Tucker | 425/550 X |
| 2,890,491 | 6/1959 | Hendry | 425/550 X |
| 3,192,299 | 6/1965 | Hendry | 425/550 X |
| 3,247,304 | 4/1966 | Ninneman | 425/558 X |
| 4,067,673 | 1/1978 | Hendry | 425/147 X |
| 4,082,486 | 4/1978 | Cerano | 425/550 X |
| 4,260,359 | 4/1981 | Dannels | 425/549 X |

FOREIGN PATENT DOCUMENTS

53-37763 7/1978 Japan .................................. 425/558

Primary Examiner—Thomas P. Pavelko
Attorney, Agent, or Firm—Pearne, Gordon, Sessions, McCoy, Granger & Tilberry

[57] ABSTRACT

Screw feeder and ram injector units for injection molding presses are disclosed. The feeder and injector units incorporate several novel features including power extension and retraction of the feeder unit by the drive ram of the injector unit. The screw feeder unit is supported directly on the ram unit without the necessity of separate supports on the press frame. A ram drive piston and injector plunger are laterally supported by means supporting the drive assembly on the injector assembly. Temperature control of molding compound is afforded by fluid circulation in a block carried on the inlet area of the screw feeder and a jacketed outlet nozzle on the ram injector.

24 Claims, 15 Drawing Figures

SCREW FEED/RAM INJECTOR

BACKGROUND OF THE INVENTION

The invention relates to molding apparatus and, in particular, pertains to improvements in ram injection molding presses and the like.

PRIOR ART

Ram injection molding presses are used in the production of rubber products, for example. It is known to precondition and feed uncured molding compound to a ram injection storage chamber by a screw feeder. Such preconditioning and feeding improve production capacity and product uniformity, while reducing waste and rejected parts.

A variety of molding machines, such as compression molding machines, existing in industry are adaptable to screw feed/ram injector systems. A problem with certain prior screw feed/ram injector systems intended for retrofit applications is that they require substantial installation time and labor. The fitting up of such prior screw feed/ram injectors on existing machinery is often tedious and demanding of a high degree of skill and experience where physical alignment of various parts is critical and several parts of the feeder are separately mounted on a molding press frame.

Another disadvantage of certain known screw feed/ram injector attachments for existing molding machines is that they require separate actuators for extending and retracting the feeder respectively into its operational and idle positions. A separate actuator adds to the cost and complexity of the screw feed/ram injector system.

SUMMARY OF THE INVENTION

The invention provides improvements in ram injector molding presses and screw feeders for such presses. In accordance with one feature of the invention, there is provided a screw feeder unit which is supported exclusively on the ram injection portion of a molding press. Installation of the screw feeder is thus simplified and expedited because the feeder need only be fitted to the ram injection without concern for alignment, tie-downs, mounting points, and the like for the feeder directly on the press frame.

In accordance with another feature of the invention, the means mounting the screw feeder to the ram has provisions for displacement of the feeder unit between an extended operational position and a retracted idle position. Still another feature of the invention involves a novel interrelationship of the screw feeder mounting arrangement and the ram drive assembly. As disclosed, the screw feeder mounting structure is selectively connected to the ram drive when it is desired to retract the feeder. With the mounting structure properly coupled to the ram drive, the screw feeder is retracted or extended under the power of the ram drive. The necessity for a separate actuator and attendant controls for the displacement of the screw feeder is thereby eliminated.

Still another feature of the invention relates to a mounting structure for the ram drive assembly on the molding press. The disclosed ram mounting structure cooperates with a guide block fixed on the ram drive assembly piston to stabilize the piston against lateral buckling-like deflection. As disclosed, the guide block is advantageously located at the point where the ram piston is coupled to a plunger of the injection cylinder assembly.

Yet another feature of the invention resides in a temperature control block applied to the inlet zone of the screw feeder unit. The disclosed temperature control block is clamped in direct contact with the screw feeder unit in a zone surrounding the inlet for a high degree of direct thermal communication between these elements. The temperature control block includes an internal series flow circuit for temperature control fluid, which circuit passes though substantially the entire outer boundary of the block to assure a uniform temperature distribution in the block and encircled area of the screw feeder.

An additional feature of the invention pertains to an injector nozzle water jacket at the outlet of the ram unit, which inproves temperature control of this area of the device. The nozzle water jacket, which encircles a central orifice forming an exit path for molding compound from the ram, has an internal channel circuit for circulation of temperature control fluid. As disclosed, the channel circuit is comprised of a double heliz groove pattern cut into a body element of the nozzle water jacket. One groove of the double helix is connected directly to an inlet, while the other groove is connected to an outlet. With the grooves interconnected at one end of the jacket, the inlet and outlet can be advantageously positioned at the more accessible one end of the nozzle.

DESCRIPTION OF THE PREFERRED EMBODIMENT

Figures 1, 11, 12:
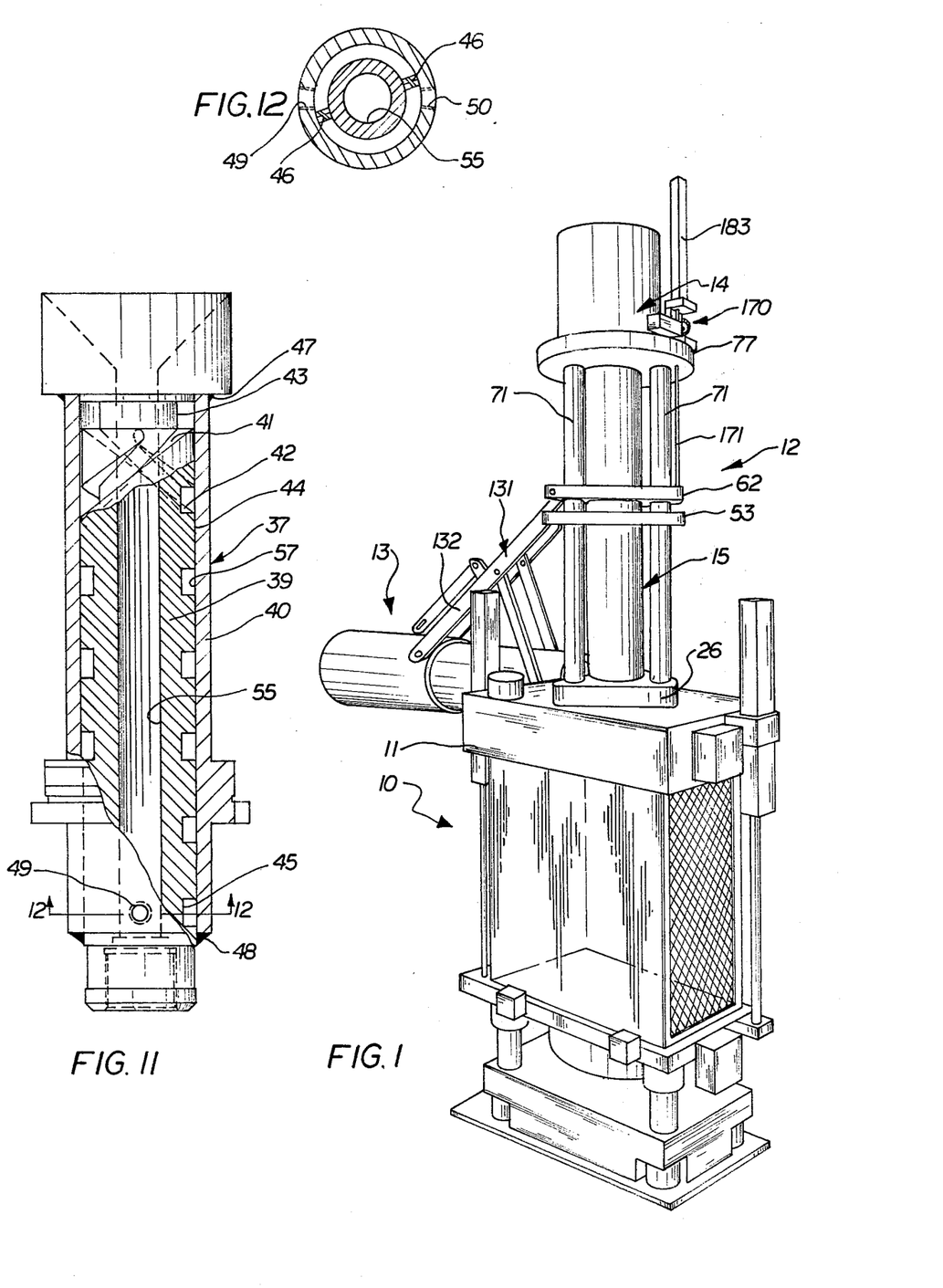
FIG. 1 is a somewhat schematic, perspective view of a molding press incorporating the present invention.
FIG. 11 illustrates an injector nozzle water jacket assembly constructed in accordance with the invention.
FIG. 12 is a transverse sectional view of the water jacket assembly taken in the plane indicated at 12—12 of FIG. 11.

Referring now to the drawings, and in particular to FIG. 1, there is shown an injection molding press 10 suitable for injection molding rubber and like thermosetting materials. The machine 10 is of the vertical type in which horizontal platens (not shown) on the machine frame, designated 11, cooperate to hold mating dies. One of the platens, typically, is vertically movable with respect to the other for removal of molded articles formed in the mold cavities.

A ram-type injector unit 12 is vertically disposed on an upper face of the machine frame 11. Carried on the ram injector unit is a screw feeder unit 13. The ram injector unit comprises a piston and cylinder ram drive assembly 14 at a rearward or upper end and a piston and cylinder injector assembly 15 at a forward or lower end.

Figures 2, 2A, 3, 4:
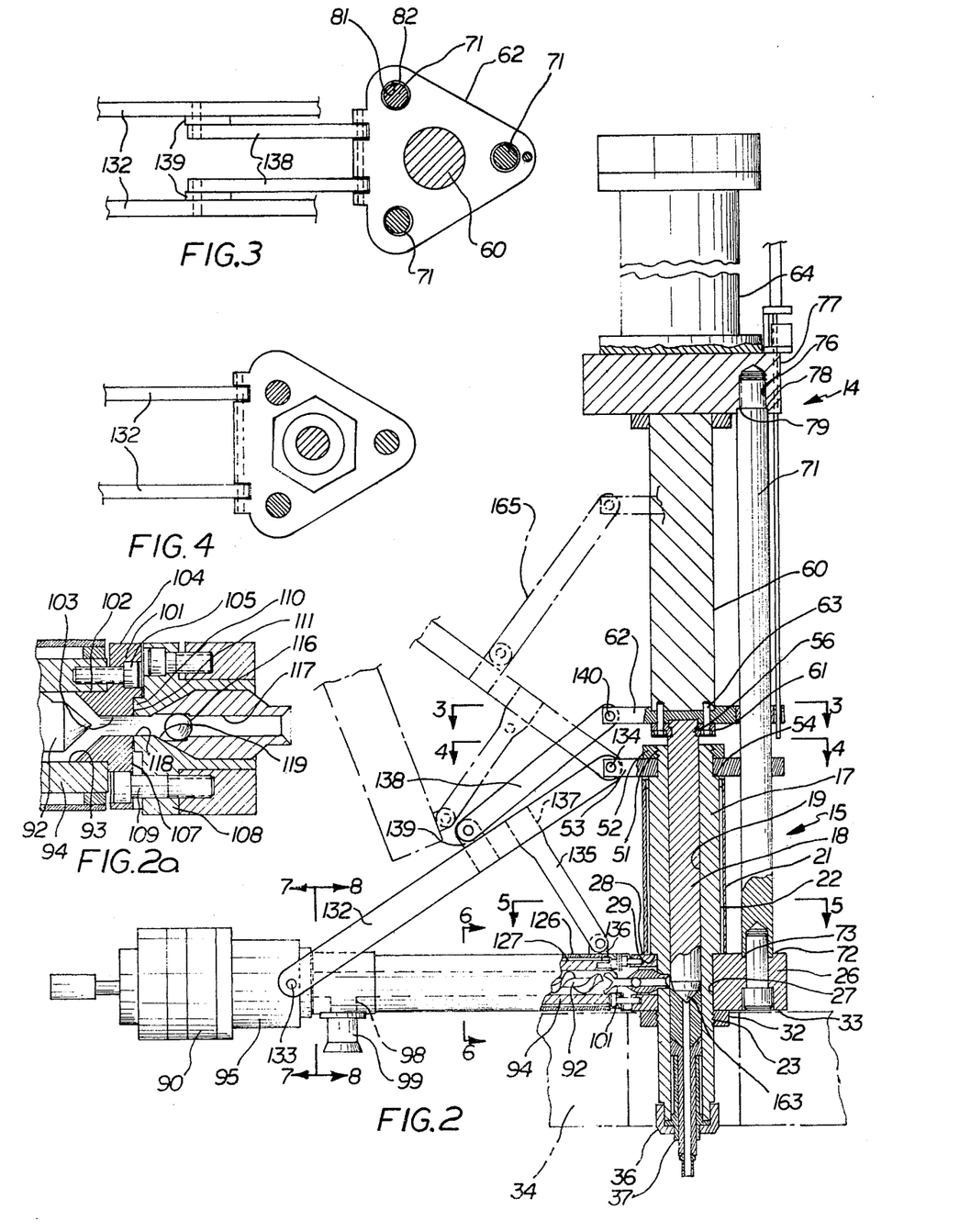
FIG. 2 is an elevational view, with certain elements in section, of a ram injector unit and cooperating screw feeder unit incorporating features of the invention.
FIG. 2A is a fragmentary, cross-sectional view of the coupling area between the ram injector and screw feeder units on an enlarged scale.
FIG. 3 is a sectional view of a portion of the apparatus in FIG. 2 taken across the plane indicated at 3—3.
FIG. 4 is a view similar to FIG. 3, taken at the plane 4—4 indicated in FIG. 2.
Figure 5:
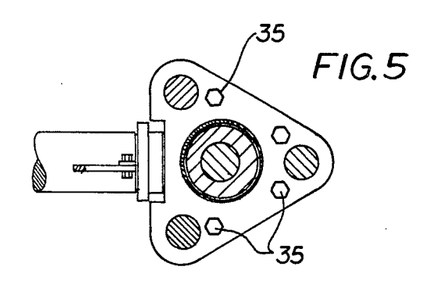
FIG. 5 is a view similar to FIG. 3, taken in the plane 5—5 indicated in FIG. 2.

The injector assembly 15 includes a cylinder 17 and a cooperating piston or plunger 18. The cylinder 17 is formed by a cylindrical tube having a central cylindrical bore 19 extending its full length. A major portion of the axial length of the cylinder 17 is jacketed by a thin wall cylindrical tube 21 sealed at its ends to form an annular space 22 for circulation of fluid to control the temperature of the cylinder and molding compound contained in the bore or storage chamber 19. Suitable inlets and outlets (not shown) are provided for supplying and discharging fluid, such as water, to the jacket space 22. The cylinder 17 has a relatively thick sidewall area along roughly its rearward or upper half length. The forward or lower half length portion of the cylinder 17 is somewhat reduced in outside diameter. The cylinder or tube 17 is threaded at 23 for purposes of fixing it to a triangular flange block 26 which has a bore 27 which closely fits the exterior of the tube at the rearward end of the reduced diameter portion. In assembly, an upper face 28 of the block 26 abuts a radial shoulder 29, forming a transition between the heavy sidewall portion of the cylinder 17 and the reduced diameter portion of the cylinder. The cylinder 17 is fixed to the block 26 by a jam nut 32 threaded on the tube against a lower face 33 of the block. The flange block 26 is fixed to the upper face of the machine frame by bolts 35 (FIG. 5) threaded into suitable holes in a top plate 34 of the machine frame.

A nut 36 threaded on the forward end of the cylinder 17 retains a water jacket nozzle 37 within the forward end of the cylinder bore 19. As shown in FIG. 11, the nozzle 37 comprises inner and outer sleeve body elements 39,40, respectively. The inner nozzle body 39 has formed on its exterior a pair of grooves 41,42 in a double helix pattern. Adjacent a rearward end of the inner body 39, the grooves 41,42 communicate through a circumferential groove 43. The outer cylindrical surface or land area 44 surrounding the grooves is substantially equal in diameter to a bore 57 in the outer body sleeve 40. Adjacent their forward ends, the grooves 41,42 communicate with an annular groove 45 but communication between the grooves 41,42 at this end is prevented by tabs 46 (FIG. 12) welded into the groove 45. The outer body sleeve 40 is sealed to the inner sleeve at its ends by circumferential welds 47,48. Radial holes 49,50 which are provided with female pipe threads provide an inlet and outlet, respectively, for temperature control fluid which is caused to circulate serially through one groove in a rearward direction and then through the other groove in a forward direction. Such fluid is adapted to control the temperature of the nozzle and, consequently, molding compound passing through a central aperture 55 in the inner body 39 from the storage chamber 19.

At its top or rearward end, the injector cylinder 17 is reduced in diameter and externally threaded at 51. A threaded nut 52 retains a triangular flange block 53 on this end 51 of the cylinder 17 against a radial shoulder 54 provided on the cylinder 17.

The injector piston or plunger 18 operates in the cylinder bore 19 with a close sliding fit. Adjacent its upward or rearward end, the piston 18 is formed with an annular groove 56, permitting it to be coupled with a piston 60 of the ram drive assembly 14 by means of a diametrally split collar 61 interlocking with the groove and fixed to a triangular flange block 62. The block 62, in turn, is fixed to the drive piston 60 by screws 63 axially threaded into the lower forward face of the piston. The ram drive piston 60 operates in an associated cylinder 64. The piston 60 is hydraulically driven by pressurized fluid introduced into the cylinder 64 through hydraulic lines (not shown). In a known manner, the piston or, technically, piston rod 60 is provided with an enlarged head (not shown) enabling it to be of the double-acting type for both extension forwardly toward the injection cylinder 17 and retraction rearwardly away from the injection cylinder.

The ram drive assembly 14 is supported on the machine frame 11 through a plurality of round bars 71 straddling the drive piston 60 and injector assembly 15. The forward ends of the bars 71 are retained against radial shoulders 72 or faces in precision-located counterbores 73 in the flange block 26.

At their rearward ends, the bars 71 are threaded and turned into precision-located, threaded holes 76 in an end block 77 of the drive cylinder 64. The bars 71 are threaded into the holes 76 until radial shoulders 78 on the bars tightly engage respective radial end walls 79 of counterbores associated with these threaded holes 76.

In the illustrated embodiment, the ram drive support rods 71 are three in number. It can be appreciated that the disclosed rod support arrangement is capable of supporting the ram drive assembly 14 in close alignment with the injector assembly 15 with relatively few dimensional tolerance problems and at low fabrication cost.

As indicated in FIGS. 2 and 3, the flange block 62 forming a portion of the coupling means between the ram drive piston 16 and injector plunger 18 includes a set of holes 81 and associated cylindrical bushings 82 which operate as linear bearings to provide a close sliding fit on the associated bars 71.

Figure 6:
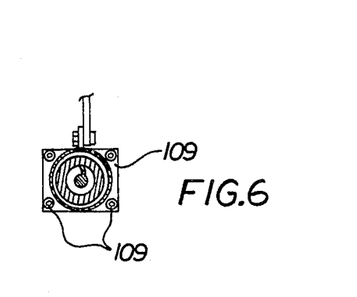
FIG. 6 is a transverse, cross-sectional view of the screw feeder unit, taken in the plane 6—6 indicated in FIG. 2.

FIGS. 1 and 2 illustrate the screw feeder 13 in its operational position on the ram injector unit 12. In this position, the screw feeder unit 13 extends radially in a horizontal plane from the injector assembly 15. The screw feeder 13 includes a hydraulic rotary motor 90 at its rearward end distal from the injector assembly 15. The motor 90, energized by fluid conducted through suitable hydraulic lines (not shown), rotates an elongated screw 92 operating in a bore 93 of a cylinder or barrel 94 of the feeder unit 13. A suitable drive coupling between the motor 90 and screw 92, as well as a thrust bearing for the screw, are contained within an adapter housing 95 in accordance with conventional practice. The screw 92 rotates in the bore 93 with a relatively close clearance. A radial aperture 98 through the sidewall of the barrel 94 provides, with an associated rectangular tube 99, an inlet for molding compound. Rotation of the screw 92 forces molding compound forwardly along the barrel 94, eventually through an outlet nozzle 101 at the forward end of the barrel 94. The outlet nozzle has a rearwardly extending nipple portion 102 which fits closely with the barrel bore 93 to prevent escape of molding compound other than through a central passage 103 in the nozzle 101. A flange portion 104 of the outlet nozzle 101 has a rectangular exterior profile in a plane perpendicular to the axis of the screw 92, as indicated in FIG. 6. This rectangular portion 102 is removably fixed to the screw barrel 94 by screws 105 (FIG. 2A).

In the operational position of the screw feeding unit 13, a forward face 107 of the nozzle 101 abuts and mates with a coupling 108. The nozzle 101 is releasably secured to the coupling 108 by screws 109 (FIGS. 2A and 6). It will be understood that the plane of the section revealing the screws 109 in FIG. 2A is above the section plane of the barrel 94 and remainder of the nozzle 101 so as to reveal the disposition of these screws.

The coupling 108 has a central, rearwardly extending, circular boss 110 which is received in a shallow, cylindrical bore 111 in the nozzle 101. The boss 110 is slightly axially longer than the depth of the bore 111 so that opposed end faces of the boss and base of the bore abut without contact between radially outer regions of the nozzle and coupling. A ball 116 in a fluted passage 117 permits forward flow of molding compound through the aligned central apertures 103 and 118 in the nozzle 101 and coupling 108, respectively, but checks reversal of such flow against a conical seat 119. The fluted passage 117 communicates directly with the forward end of the injector storage chamber 19. A forward major length of the screw barrel 94 is encircled by a thin jacket tube 126 forming an annular space 127 for circulation of temperature-controlled fluid supplied and carried off by suitable lines connected to this space. The jacket 126 is sealed on the barrel 94 by conventional means.

Figures 7, 8, 9, 10:
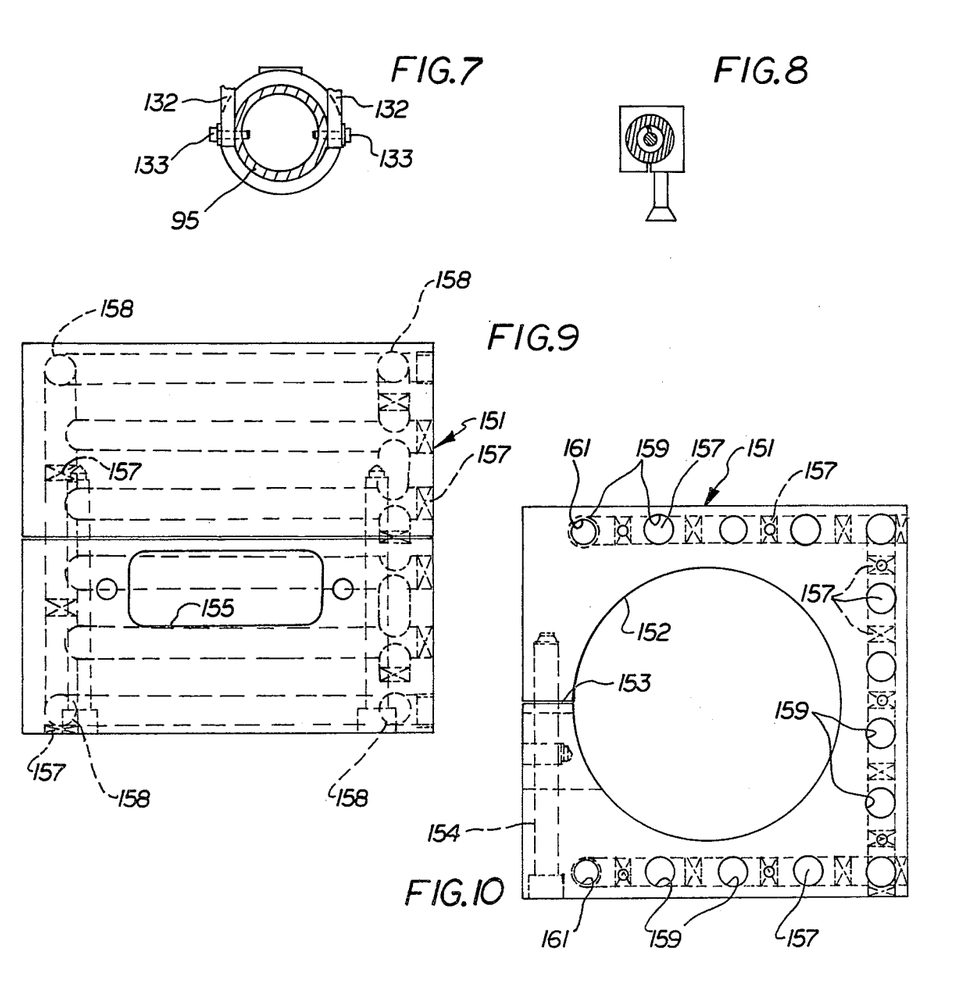
FIG. 7 is a transverse view of the screw feeder taken in the plane 7—7 indicated in FIG. 2.
FIG. 8 is a transverse view of the screw feeder unit taken in the plane 8—8 indicated in FIG. 2.
FIG. 9 is a side view of a temperature control block constructed in accordance with the invention.
FIG. 10 is an axial end view of the block of FIG. 9.

A temperature control block 151 encircles the screw tube 94 in an axial zone which extends beyond the axial limits of the inlet port 98 and inlet tube 99. The block illustrated in detail in FIGS. 9 and 10 is machined or otherwise formed from a solid block of steel or other suitable metal. The block has a relatively large through bore 152 substantially equal in diameter to the outside diameter of the screw barrel 94 in the area of the inlet 98. One side of the block 151 is split through at 153, enabling the block to be tightly clamped directly on the screw tube 94 with socket head bolts 154 disposed in holes perpendicular to the plane of the slot 153. Clamping of the block 151 by constricting the bore 152 tightly against the exterior of the barrel 94 affords a high degree of thermal conduction between these bodies. The block includes a rectangular aperture 155 which aligns with the screw inlet port 98 for passage of molding compound into the barrel bore 93. A circuitous path for temperature control fluid is formed in the block 151 by a set of passages drilled or otherwise formed in the block, and a set of plugs 157. The passages are formed by a set of four straight bores 158 in planes perpendicular to the axis of the screw bore 152 and 14 holes 159 in the axial direction of the screw bore. The various holes 158, 159 are locally stopped up by the plugs 157 at the points indicated by the X's in FIGS. 9 and 10. The open ends of two of the axial holes 159 are provided with female pipe threads at 161 for means of connection of the holes with a source and sink of temperature control fluid such as water. Study of FIGS. 9 and 10 reveals that the plugs 157 are strategically located in positions in the holes 158, 159 to develop a series flow path for fluid through a plurality of axial trips through the block as its course extends between the inlet and outlet ports formed by the threaded bore entrances 161.

The screw feeder unit 13 is supported on the injector unit 12 by the bolted connection of the feeder nozzle 101 to the coupling 108 and a linkage assembly 131. The linkage assembly 131 includes a first link pair 132 having link ends pivotally connected to the adapter housing 95 on trunnion mounts formed by shoulder bolts 133 threaded into this housing (FIG. 7). The upper ends of the links of the pair 132 are pivotally connected to a common side of the flange block 53 (FIG. 4) by a hinge pin 134. A bar 135 bolted at one end to a bracket 136 fixed to the screw jacket 126 and at the opposite end bolted to a bracket 137 bridging the first link pair 132 establishes a fixed angular relationship in the vertical plane of FIG. 2 between the screw feeder unit 13 and first link pair 132. A second link pair 138 has one set of its ends pivotally connected to the midsection of the first link pair 132 through associated brackets 139 and its opposite ends pivotally connected to a common side of the triangular block 62 (FIG. 3) by a hinge pin 140.

Figures 13, 14:
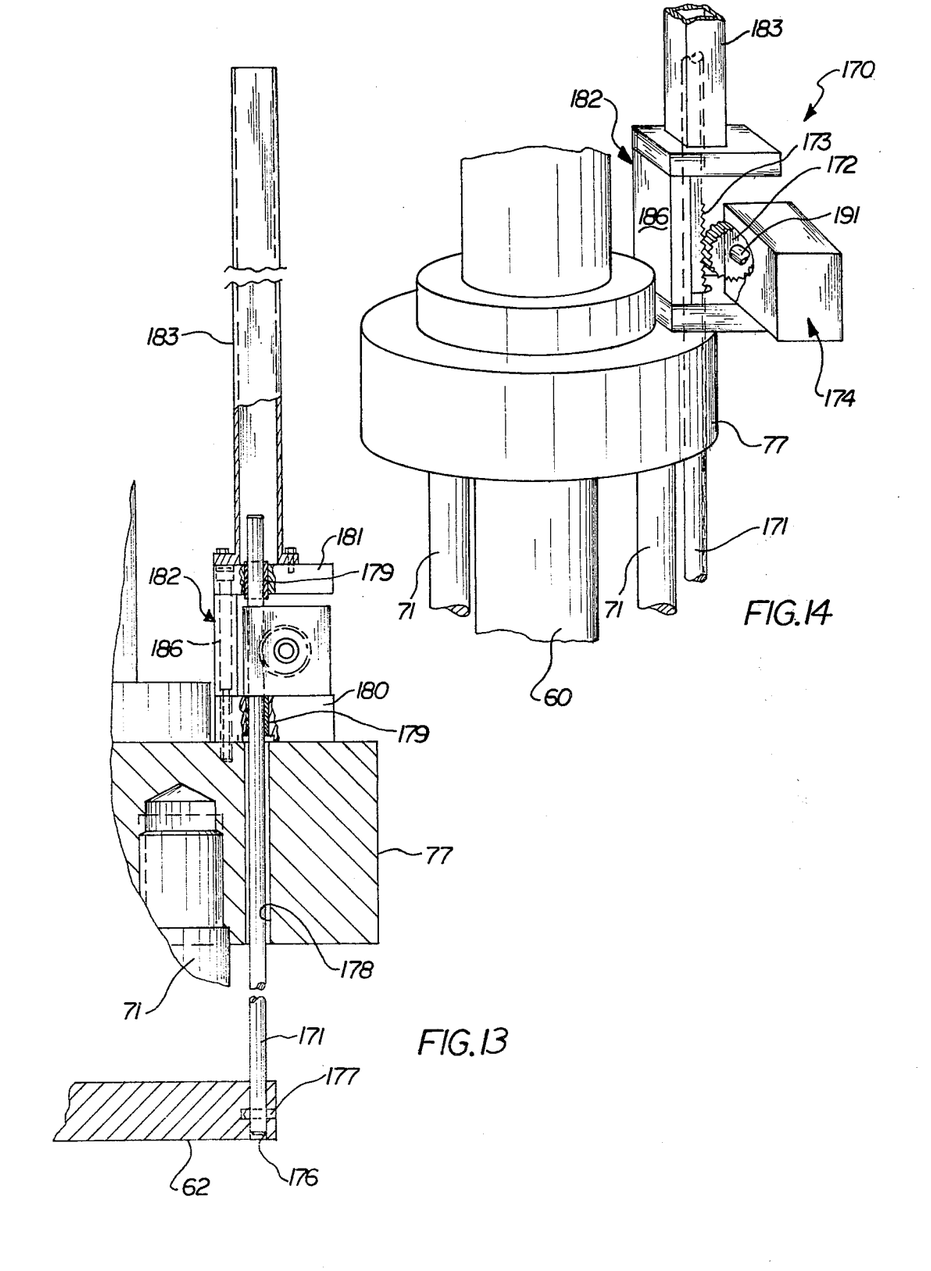
FIG. 13 is an elevational, fragmentary view of a shot size measuring device and its relationship to various parts of the molding press.
FIG. 14 is a perspective view of the measuring device on an enlarged scale.

Referring now to FIGS. 13 and 14, a device generally indicated at 170 for measuring the amount of molding material or shot size accumulated in the storage chamber 19 is illustrated. The measuring device 170 includes an elongated, rigid rod 171, a pinion 172 meshed with teeth 173 formed on the rod 171 in the manner of a rack, and a rotary encoder 174 driven by the pinion. The rod 171 has its lower end received in a bore 176 in the triangular flange block 62 and fixed therein by a pin 177. The rod 171 extends through a clearance hole 178 in the end block 77 and closely fitting bores of bushings 179. The bushings 179 are pressed or otherwise secured in parallel spaced plates 180, 181 of a mounting bracket 182. A square tube 183 receives and shields the rod 171. A spacer plate 186 of the bracket 182 and the upper plate 181 are bolted to the lower plate 180, while the lower plate is bolted to the end block 77. The rotary encoder 174 is fixed by screws or other retaining means to the bracket 182 in the space between the opposed plates 180, 181 so that it is fixed with reference to the storage chamber 19. The rotary encoder 174 includes a rotary shaft 191 on which the pinion 172 is fixed. The encoder, which is of a commercially available type, operates as a transducer to convert angular displacement of the pinion 172 and shaft 191 into corresponding electrical signals.

In operation of the press, the screw feeder unit 13 forces compound into the storage chamber 19. The nozzle 37, because of the relatively high viscosity of molding compound, provides sufficient restriction when there is no downward hydraulic force on the piston 60 to cause this piston to be retracted upwardly as molding compound enters the storage chamber 19. The volume of compound in the chamber 19 is in direct proportion to the rearward displacement of the plunger 18 and piston 60. It will be understood that the rearward displacement of these plunger and piston elements is accompanied by precisely the same displacement of the flange block 62, and thus the rod 171. The screw feed drive motor 90 continues to operate until the rotary encoder 174, having its shaft 191 rotated by movement of the rod 171, signals the main controls of the press that a predetermined displacement of the rod 171 (from a forward or lowermost position coresponding to full extension of the plunger 18) is reached and the plunger has swept through a volume corresponding to a desired shot volume. At this point, the screw drive motor 90 is stopped by the press controls and the ram drive cylinder 64 is energized to express the molding compound from the storage chamber 19.

The disclosed mounting arrangement of the encoder 174 and rod 171 of the volume measuring device 170 affords a high degree of measuring accuracy. Specifically, the rod 171 is laterally guided by the spaced bushings 179 to eliminate extraneous motion and its transducer is engaged with the rod at a point intermediate the spaced bushings.

Production operation of the ram injector unit 12 is generally conventional. Molding compound supplied to the screw inlet 98 is fed by the screw 92 into the storage chamber 19 of the injector assembly 15 until a sufficient quantity or full shot is contained therein. Automatic controls responsive to the measuring device 170 stop the screw feed motor 90 and cause hydraulic fluid to energize the ram drive assembly 14. The drive piston 16 descends forwardly, driving a face 163 of the plunger 18 from a retracted position adjacent the upper end of the storage chamber 19 forwardly down to a bushing 38. Compound is driven from the storage chamber 19 into a mold cavity communicating with the injector outlet 37. The ball 116 prevents reverse flow of compound from the chamber 19 into the screw barrel 93. In production operation of the press 10, the ram reciprocates between upper and lower positions. The second link pair 138 during such production operation, as shown in FIG. 1, is disconnected from the related flange block 62 on the ram piston 60 by removal of the associated hinge pin 140.

The temperature control block 151 provides improved temperature control by reducing temperature stratification and extreme temperatures in the screw barrel 94 in the axial zone of the inlet port 98. The series flow circuit provided by the holes 158, 159 and plugs 157 ensures that the entire block 151, and therefore the area of the screw barrel 94 embraced by the block, is uniformly maintained at desired temperatures. Similarly, the water-jacketed injector nozzle 37 of the ram 12 is maintained at a desired temperature by the circulation of fluid through the helical grooves formed by its interior walls.

During its reciprocation, the ram drive piston 60 is transversely supported by the triangular block 62, which travels with it. This block 62 is laterally or radially supported with respect to the axis of the ram 14 by the rods or bars 71. The location of this lateral support at the plane of the coupling between the ram piston 60 and injector plunger 18 is particularly advantageous because this is a point where these pistons are likely to suffer buckling-like lateral deflection.

In a variety of situations, such as between production runs or during scheduled maintenance of the press 10, it is desirable to separate the screw feeder unit 13 from the ram injector unit 12 for inspection and improved access to these systems. The disclosed linkage arrangement supporting the screw feeder unit 13 has the unique ability to retract the feeder unit away from the operative position illustrated in FIGS. 1 and 2. This displacement of the screw feeder unit 13 is accomplished under the power of the ram drive assembly 14 in the following manner. The screw nozzle 101 is unbolted from the coupling 108 and the second link pair 138 is reconnected to the associated triangular flange block 62 with the pin 140. The links 132, 138 in the state depicted in solid lines in FIG. 2 when the ram drive piston 60 is retracted, the flange block 62 is drawn rearwardly, followed by the link pair 138. Retraction of the links 138 causes the other links 132 and screw feeder unit 13 to rotate about the axis of the hinge pin 134 in a vertical plane laterally away from the injector unit 12. Upon full retraction of the ram piston 60, the feeder unit 13 assumes the phantom position designed 165 in FIG. 2. In this retracted position, the screw 92 can be readily purged in preparation for a change in compound, for example. Also, the nozzle 101 can be removed from the barrel 94 for subsequent removal of the screw 92 for maintenance purposes.

Since the screw feeder unit 13 is supported on the links 132, 138 for motion between the operational and retracted positions on a controlled path, hydraulic lines operating the screw motor 90 and temperature control fluid lines connected to the block 151 and jacket space 127 can remain connected to the feeder unit 13 when it is retracted. Piping of such lines is particularly simplified where the lines include flexible portions routed near the hinge pin 134. Still further, the mounting of the screw feeder unit 13 exclusively on the ram injector unit 12 by means of the linkage assembly 131 and bolted coupling of the screw feeder nozzle 101 to the coupling 108 simplifies retrofit applications of the screw feeder and ram injector units 12, 13 to existing machines, as only the ram injector unit need be fitted to a machine in the field since the screw feeder unit 13 can be factory-installed or fitted to the injector unit 12.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a compression molding or like type machine having a machine frame including a plate member associated with one of two platens of the machine, a retrofitted ram injector unit fixed on the machine frame plate member and including a piston and cylinder ram drive assembly and a piston and cylinder injector assembly operated by the drive assembly, the injector assembly including mounting block means removably secured to said plate member in a manner capable of exclusively supporting said injector unit on said plate member, a screw feeder unit for charging molding compound into the injector cylinder, mounting means for removably supporting said screw feeder unit on said injector cylinder assembly rigidly on said mounting block means, said mounting means being constructed and arranged in such a manner as to be capable of providing the sole support for said screw feeder unit free of significant direct structural interconnection with said frame.

2. A ram-operated injection molding machine as set forth in claim 1, wherein said mounting means includes means for supporting said screw feeder unit for movement between an operative position and a retracted position relative to said injector cylinder assembly.

3. A ram-operated injection molding machine as set forth in claim 2, wherein said support means includes means responsive to movement of said ram to initiate movement of said screw feeder unit between said operative and retracted positions.

4. A ram-operated injection molding machine as set forth in claim 3, wherein said responsive means includes means to derive the forces required to displace said screw feeder unit from the ram drive assembly.

5. A ram-operated injection molding machine as set forth in claim 4, wherein said force deriving means includes a mechanical linkage.

6. A ram-operated injection molding machine as set forth in claim 5, wherein said mechanical linkage includes an element fixed to the piston of said ram drive assembly.

7. A ram-operated injection molding machine as set forth in claim 6, wherein said mechanical linkage includes means to cause said screw feeder unit to pivot in a vertical plane.

8. A ram-operated injection molding machine as set forth in claim 7, wherein said pivot causing means includes means for rotating said screw feeder unit about a point lying in a direction opposite, with reference to said screw, the direction toward a main portion of said machine frame.

9. A ram-operated injection molding machine as set forth in claim 8, wherein said support means supports said screw feeder unit in a plane perpendicular to the axis of said ram injection unit during normal operation of said machine.

10. Apparatus for retrofitting a compression or like type molding machine comprising a ram unit and a screw feeder unit for charging the ram unit with a shot of material, said ram unit including a piston and cylinder drive assembly and a piston and cylinder injector assembly, said injector assembly inluding an inlet port in the cylinder thereof, said screw feeder unit having an outlet connected to said injector cylinder inlet, said drive assembly being drivingly connected to said injector assembly to cause the injector piston to express compound from the injector cylinder, said ram unit including mounting block means for mounting it to the frame of a compression molding machine, and means capable of supporting said screw feeder unit on said ram unit in a self-sufficient, disconnectable manner primarily on said mounting block means for normal operation of said ram unit and screw feeder unit free of separate mounting provisions between said screw feeder unit and said machine frame.

11. Apparatus for injection molding as set forth in claim 10, wherein said supporting means includes means for supporting said screw feeder unit between an operational position in which the outlet of said screw feeder unit and the inlet of the ram injector unit assembly are coupled and a retracted position wherein said screw feeder unit is displaced from said ram unit a sufficient distance to afford access for purging said screw feeder unit of molding compound and maintenance of said screw feeder unit and the like.

12. Apparatus for injection molding as set forth in claim 11, including means mechanically interconnecting the piston of said ram drive assembly and said screw feeder unit whereby retraction movement of said ram drive assembly operates to retract said screw feeder unit.

13. Apparatus for injection molding as set forth in claim 12, including means to selectively engage and disengage said unit connecting means.

14. In an injection molding press, a frame for supporting opposed platens, a ram injector unit for injecting compound into dies carried on the platens, said ram injector unit including a piston and cylinder drive assembly, and a piston and cylinder injector assembly coaxially arranged in tandem with said drive assembly, the piston elements of said assemblies being rigidly fixed to one another, said piston elements being reciprocatable along an axial path, the cylinder of said injector assembly having a sidewall inlet for admitting molding compound through said sidewall and an outlet at an end opposite said drive assembly, support means straddling said injector assembly and extending rearwardly from said injector cylinder along said path to the cylinder of said drive assembly, said support means supporting said drive assembly on said frame and being capable of sustaining as a tension load hydraulic forces developed by said support means for laterally supporting said piston elements to limit any lateral movement thereof during reciprocation movement thereof.

15. An injection molding press as set forth in claim 14, wherein said lateral support means is slidably engaged with said drive assembly support means.

16. An injection molding press as set forth in claim 15, wherein the piston elements of said injector and drive assemblies are separate bodies, and means coupling said bodies to each other, said lateral support means being disposed adjacent said coupling means.

17. An injection molding press as set forth in claim 16, wherein said drive assembly support means comprises a plurality of parallel tension rods each spaced from said piston element.

18. An injection molding press as set forth in claim 17, wherein said lateral support means includes bearing means embracing said rods.

19. A screw feeder for a molding press, including an elongated barrel formed by a cylindrical sidewall having an internal cylindrical bore and a central axis, said barrel having an outlet adjacent a forward end thereof communicating with said barrel bore, said barrel having an inlet passage through said sidewall remote from said outlet for admitting molding compound into the barrel, a feed screw disposed in the barrel for rotation about said barrel axis, said screw having a major diameter closely fitting said bore, means for rotating the screw on the barrel axis, a temperature-control block circumferentially surrounding and in thermal communication with said barrel in an axial zone including said inlet and limited in length to substantially less than the distance between said inlet and outlet, said block having serially connected internal flow paths for conducting temperature-controlling fluid in a serpentine path forwardly parallel to the axis of the barrel, circumferentially of the barrel, and rearwardly parallel to the axis of the barrel within said block, said flow paths including a multiplicity of both forward and rearward courses along the barrel.

20. A screw injector for a molding press as set forth in claim 19, wherein said block is in thermal communication by direct physical contact with the exterior of said barrel.

21. A screw injector for a molding press as set forth in claim 20, wherein said block has a central bore in which said barrel is disposed, said block having an aperture radially disposed with respect to said bore, said aperture being aligned with said inlet to permit passage of molding compound through said aperture into said barrel.

22. A screw injector for a molding press as set forth in claim 21, wherein said block has a slot lying in a plane generally radially aligned with respect to said barrel, said slot permitting said central bore to be constricted against the sidewall of said barrel.

23. In a ram injector unit for a molding press, said injector unit including a storage chamber for molding compound, an outlet nozzle for said storage chamber, said outlet nozzle having a central aperture for discharge of molding compound, said nozzle including a pair of concentric sleeve elements, one of said elements having multiple helical grooves formed on a surface thereof in contact with and closed by a corresponding surface of the other element, one of the grooves being connected to an inlet at one end of the elements, means for communicating fluid from said one groove to another at the opposite end of said elements, the other groove being connected to an outlet at said one end of said elements.

24. In a molding press, a storage chamber for molding compound, said storage chamber having an outlet adapted to be connected to a mold cavity, a plunger for forcibly driving the molding compound from the storage chamber, the plunger having a face adapted to directly contact molding compound in the storage chamber, a screw feeder having an outlet communicating with said storage chamber to forcibly drive molding compound into said storage chamber, said screw feeder including a screw and a rotary motor driving said screw in rotation, said chamber being arranged to permit molding compound entering said storage chamber to drive said plunger rearwardly to expand the effective volume of said storage chamber, sensor means measuring the position of said plunger in said storage chamber, and therefore the effective volume of molding compound in said storage chamber, said sensor means including an elongate element having a length at least as long as the stroke of said plunger, said elongate element having an end affixed relative to said plunger, and measuring means mechanically interengaged with said elongate element and fixed relative to said storage chamber, the interengagement of said measuring means with said elongate element permitting said measuring means to measure displacement of said elongate element with said plunger and thereby determine the amount of molding compound in said storage chamber for interruption of operation of said rotary motor, said elongate element being laterally supported by spaced guide means fixed relative to said storage chamber, said measuring means engaging said elongate element at a zone intermediate said spaced guide means.

* * * * *